(12) United States Patent
Somuah

(10) Patent No.: US 8,424,825 B2
(45) Date of Patent: Apr. 23, 2013

(54) ADJUSTABLE HOLDER FOR ELECTRONIC DEVICES

(76) Inventor: Eddie Somuah, Milford, CT (US)

( * ) Notice: Subject to any disclaimer, the term of this patent is extended or adjusted under 35 U.S.C. 154(b) by 173 days.

(21) Appl. No.: 13/049,891

(22) Filed: Mar. 16, 2011

(65) Prior Publication Data

US 2012/0235001 A1 Sep. 20, 2012

(51) Int. Cl.
*A47G 1/10* (2006.01)
*F16B 45/00* (2006.01)
*B42F 13/00* (2006.01)
*A47B 97/04* (2006.01)
*A47F 5/02* (2006.01)

(52) U.S. Cl.
USPC ........ 248/316.4; 248/339; 248/307; 248/130; 248/460

(58) Field of Classification Search .................. 248/339, 248/918, 346.01, 346.03, 682, 683, 146, 248/176.3, 309.1, 316.4, 316.6, 316.8, 317, 248/323, 326; 211/106.01, 118, 175, 41.2
See application file for complete search history.

(56) References Cited

U.S. PATENT DOCUMENTS

| | | | |
|---|---|---|---|
| 5,305,381 A | 4/1994 | Wang et al. | |
| 5,457,745 A | 10/1995 | Wang | |
| 5,694,468 A | 12/1997 | Hsu | |
| D391,844 S * | 3/1998 | Ropponen et al. | ............ D8/382 |
| 5,836,563 A | 11/1998 | Hsin-Yung | |
| 6,073,901 A | 6/2000 | Richter | |
| 6,614,908 B1 | 9/2003 | Huang | |
| 6,742,685 B2 | 6/2004 | Williams | |
| D499,092 S | 11/2004 | Fan | |
| 7,533,860 B2 | 5/2009 | Somuah | |
| 7,614,595 B2 | 11/2009 | Richter | |
| 7,861,985 B2 | 1/2011 | Galvin | |
| 8,240,628 B2 * | 8/2012 | Huang | ...................... 248/316.1 |
| 2003/0045332 A1 | 3/2003 | Lopez et al. | |
| 2005/0205728 A1 * | 9/2005 | Avery | ............................ 248/149 |

OTHER PUBLICATIONS

"Apple iPad holders", 4 pages, Jan. 7, 2011 <http://www.proclipusa.com/default.asp?sectionpath=143&processor=asp&as>.
"e-book holder", 2 pages, Jan. 11, 2011, <http://www.luxa2store.com/products/mobileholder/h4/LH0006.htm>.

\* cited by examiner

*Primary Examiner* — Jonathan Liu
*Assistant Examiner* — Muhammad Ijaz
(74) *Attorney, Agent, or Firm* — Christopher Wood; Premier Law Group, PLLC

(57) ABSTRACT

An adjustable holder for an electronic device includes four pivotally attached telescopic arms. The left, right and bottom telescopic arms include an elongated sleeve and an extendable arm that moves in and out of the sleeve. Each extendable arm has a forward projecting fin with a raised edge. The top telescopic arm includes a top elongated sleeve, a secondary sleeve and an extendable hook arm. In use, the arms are rotated and extended to fit the length and width of an electronic device, which can then be cradled between the left, right and bottom fins. The hook arm is used to suspend the electronic device from any suitable fixture and a tilt arm is used to adjust the viewing angle of the cradled device.

12 Claims, 17 Drawing Sheets

| TABLE 1 | | |
|---|---|---|
| Part No. | Part Name | Function |
| 100 | Adjustable Holder for Electronic Devices | Cradles and suspends an electronic device or book. |
| 110 | Top telescopic arm | Holds and supports the top portion of an electronic device or book. |
| 120 | Bottom telescopic arm | Holds and supports the bottom portion of a device or book. |
| 130 | Left telescopic arm | Holds the left side of an electronic device or book. |
| 140 | Right telescopic arm | Holds the right side of a an electronic device or book. |
| 150 | Top elongated sleeve | Houses a secondary sleeve. |
| 152 | Sleeve channel of top elongated sleeve | Provides passage for extendable arm to move back and forth. |
| 154 | Sleeve channel opening of top elongated sleeve | Allows at least part of the extendable arm to move in and out of the sleeve. |
| 156 | Flange | Forms the center of the adjustable holder when the holder is deployed. |
| 158 | Through-hole | Provides a hole for the central securing member. |
| 160 | Bottom elongated sleeve | Houses an extendable arm. |
| 162 | Sleeve channel of bottom elongated sleeve 160 | Provides passage for extendable arm to move back and forth. |
| 164 | Sleeve channel opening of sleeve channel 162 | Allows at least part of the extendable arm to move in and out of the sleeve. |
| 166 | Flange | Forms the center of the adjustable holder when the holder is deployed. |
| 168 | Screw hole | Provides a through-hole for the central securing member. |

*FIG. 15A*

| TABLE 1 (continued) |||
|---|---|---|
| Part No. | Part Name | Function |
| 170 | Left elongated sleeve | Houses an extendable arm. |
| 172 | Sleeve channel of left elongated sleeve 170 | Provides passage for extendable arm to move back and forth. |
| 174 | Sleeve channel opening of sleeve channel 172 | Allows at least part of the extendable arm to move in and out of the sleeve. |
| 176 | Flange | Forms the center of the adjustable holder when the holder is deployed. |
| 178 | Screw hole | Provides a through-hole for the central securing member. |
| 180 | Right elongated sleeve | Houses an extendable arm. |
| 182 | Sleeve channel of right elongated sleeve 180 | Provides passage for extendable arm to move back and forth. |
| 184 | Sleeve channel opening of sleeve channel 182 | Allows at least part of the extendable arm to move in and out of the sleeve. |
| 186 | Flange | Forms the center of the adjustable holder when the holder is deployed. |
| 188 | Screw hole | Provides a through-hole for the central securing member. |
| 190 | Secondary sleeve | Houses an extendable arm. |
| 190a | T-shaped end of secondary sleeve. | Used to keep the secondary sleeve from falling out of the top elongated sleeve. |
| 192 | Sleeve channel of secondary sleeve 190 | Provides passage for the hook arm to move back and forth. |
| 194 | Sleeve channel opening of secondary sleeve channel 192 | Allows at least part of the hook arm to move in and out of sleeve. |
| 200 | Left extendable arm | Holds left side of device. |
| 200a | T-shaped end of left extendable arm 200. | Stays inside of sleeve. |
| 200c | Left fin | Holds left side of device. |
| 200d | Raised edge | Helps grip side of device. |
| 210 | Right extendable arm | Holds right side of device. |
| 210a | T-shaped end of right extendable arm 210. | Stays inside of sleeve. |
| 210c | Right fin | Holds left side of device. |

*FIG. 15B*

| | TABLE 1 (continued) | |
|---|---|---|
| Part No. | Part No. | Part No. |
| 210d | Raised edge | Helps grip side of device. |
| 220 | Bottom extendable arm | Supports the bottom of a device. |
| 220a | T-shaped end of bottom extendable arm 220. | Stays inside of sleeve. |
| 220c | Bottom fin | Supports the bottom of a device. |
| 220d | Raised edge | Helps grip bottom of device. |
| 400 | Extendable Hook arm | Suspends the invention from a fixture. |
| 400a | T-shaped end of hook arm | Keeps hook arm inside secondary sleeve. |
| 400b | Tab | Used to pull out the hook arm. |
| 500 | Central Securing Member (spring screw) | Connects telescopic arms together |
| 600 | Tilt arm | Adjusts the tilt angle of the holder. |
| 620 | Tilt arm hinge | Allows the tilt arm to swivel. |
| C | Seat or chair | |
| D | Device such as a digital device such as, but not limited to, an iPad®, Kindle®, NookTM or other tablet computer or e-book. | |

*FIG. 15C*

ADJUSTABLE HOLDER FOR ELECTRONIC DEVICES

CROSS-REFERENCE TO RELATED APPLICATIONS

Not Applicable

STATEMENT REGARDING FEDERALLY SPONSORED RESEARCH OR DEVELOPMENT

Not Applicable.

FIELD OF THE INVENTION

The present invention is related to the field of electronic device holders. More specifically, the invention is an adjustable holder for suspending an electronic device, such as an iPad®, Kindle®, Nook™ or other tablet computer or e-book, in a comfortable viewing position from any appropriate fixture.

BACKGROUND OF THE INVENTION

The growing number of tablet computers and electronic reading devices such as the iPad®, Kindle® and Nook™ being used by a technically savvy consumer population has engendered an increase in use of these devices in various settings. These settings include buses, trains, ships, aircraft and other forms of transportation. Most vehicles and other forms of transportation are not equipped with convenient accessories to allow passengers to use these products without having to balance them on their lap or on the floor. This can lead to back strain, neck strain, or accidental damage to the electronic device if it gets dropped, kicked, or something is dropped on it. There is therefore a need for a device to securely hold such electronic devices at or near eye level in various settings.

A review of the prior art follows.

U.S. Pat. No. 5,457,745 discloses an adjustable mobile phone holder comprising a lower housing, an upper housing, a left plate combination, a right plate combination, and a slide block. The lower housing matches with the upper housing; left and right left plate combinations are movably inserted into respective channels on the upper housing for adjustment in width; two insert plates are movably put into respective vertical plates of the left and right plate combinations for adjustment in height; and the slide block is movably put into the upper housing for adjustment in length.

U.S. Pat. No. 5,694,468 discloses a cradle for radiotelephone having a hanging hole for the cradle to be conveniently hooked in a car for a radiotelephone to stably position on the running car. The cradle includes a main body to which two side arms are laterally movably attached. The two side arms can be brought to move away from each other by depressing a control button on the main body, and can be pressed toward each other with only one hand to have a desired width between them without automatically becoming away from one another again, so that the cradle can be used to accommodate radiotelephone of any size or type. A forward projected base at the bottom of the main body bears the weight of the radiotelephone to avoid the same from slipping off the cradle due to any vibration or gravity.

U.S. Pat. No. 5,836,563 discloses a mobile phone holder which can be opened or closed by a single push of one hand. The mobile phone thus may be fetched readily or be placed therein handily without distracting too much of a driver's attention and is much safer to use. It includes mainly a frame, a cover, a clamp, an elastic member, a gear, a push button, a toggle member and a spring.

U.S. Pat. No. 6,073,901 shows a supporting device for supporting objects, particularly for supporting a telephone in a vehicle, comprising a pair of clamping wall structures at least one of which is movable and has restraining means disposed thereon, and a base body supporting the clamping wall structures and including restraining means which coact with the restraining means on the or each movable clamping wall structure so as to exert upon the latter a restraining force larger than the force exerted upon the clamping wall structures by the object clamped therebetween.

U.S. Pat. No. 6,614,908 discloses an adjustable apparatus holder used in a carrier and adapted to hold a personal electronic apparatus is disclosed to include a base panel, a first side plate slidably coupled to the base panel at one side, a second side plate pivoted to the base panel at an opposite side and held in a vertical position by springs, and a locking mechanism, which locks the first side plate when the second side plate is maintained in the vertical position, or unlocks the first side plate when the user tilts the second side plate.

The Internet reference, "E-BOOK HOLDER", page 2 recites," an e-book holder made of solid aluminum with a sleek and chic design tailor-made for the Apple iPad and other ebook readers. With firm and strong bottom, 6 supporting arms with rubber pins, and silicone pad design".

None of the above references, taken alone or in combination, are seen as teaching or suggesting the presently claimed adjustable electronic device holder.

SUMMARY OF THE INVENTION

An adjustable holder for an electronic device includes four pivotally attached telescopic arms. The left, right and bottom telescopic arms each include an elongated sleeve and an extendable arm that slideably moves in and out of its corresponding sleeve. One end of each extendable arm stays inside its corresponding sleeve while the opposite end has a forward projecting fin with a raised edge for holding the left and right sides and bottom side of an electronic device.

The top telescopic arm includes a top elongated sleeve with a secondary sleeve that slideably extends in and out of the top elongated sleeve. One end of the secondary sleeve stays inside the top elongated sleeve and an extendable hook arm slideably moves in and out of the secondary sleeve. The extendable hook arm has a tab for pulling and pushing the hook arm in and out of the secondary sleeve and has a deformable shape that can curve or bend after extending out of its sleeve and straighten when inserted back into its sleeve.

During normal use, the telescopic arms are rotated and extended to fit the length and width of an electronic device. An electronic device can then be inserted between the left, right and bottom fins. The raised edges of the fins extend out in front of the electronic device to keep it from falling forward.

In this way, the adjustable holder is used to firmly cradle an electronic device such as a tablet computer or electronic book reader. The left, right top and bottom telescopic arms support and cradle the device, while the extendable hook arm is used to suspend the electronic device from any appropriate fixture. An adjustable tilt arm on the back of the adjustable holder may be used to tilt the viewing angle of the cradled electronic device. The adjustable holder is also collapsible and easily stowed.

BRIEF DESCRIPTION OF THE DRAWINGS

FIGS. 15A-15C show a table of part numbers.

Similar reference characters denote corresponding features consistently throughout the attached drawings.

DETAILED DESCRIPTION OF THE PREFERRED EMBODIMENTS

The invention is directed to an adjustable holder for electronic devices such as an iPad®, Kindle®, Nook™ or other tablet computer or e-book in a comfortable viewing position from any appropriate fixture. The adjustable holder of the present invention is denoted generally by the numeric label 100.

Figure 4:
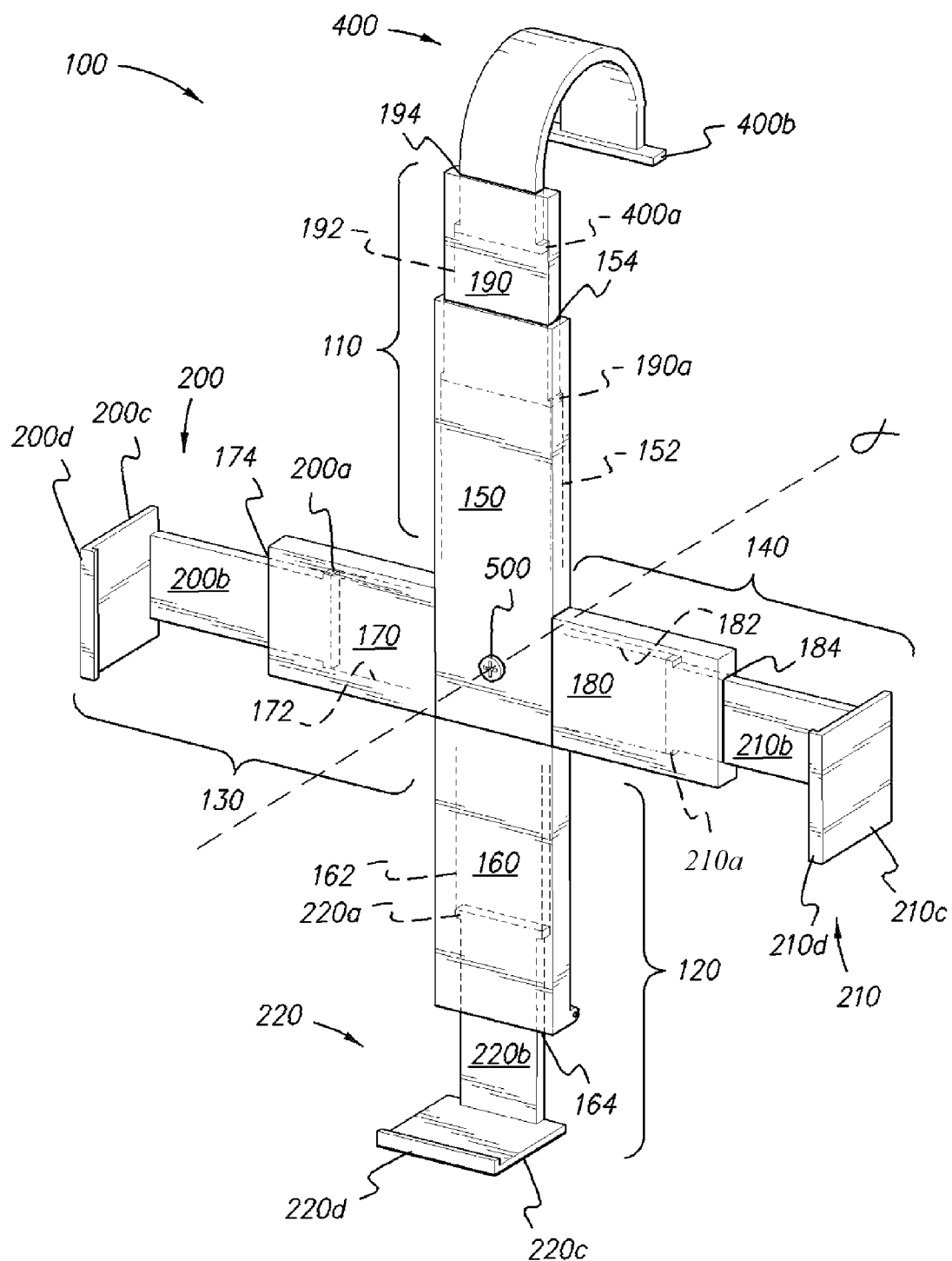
FIG. 4 is a perspective view of the Adjustable Holder with arms extended.

Referring to the figures generally, which can be viewed with the aid of Table 1 (see FIGS. 15A-15C), the adjustable holder 100 has four swiveling telescopic arms made up of a top arm 110, bottom arm 120, left arm 130, and right arm 140, as shown in FIG. 4. In a preferred embodiment, the left, right, and bottom telescopic arms of the device each include a flat elongated sleeve of rectangular cross section and an extendable arm that retractably extends therefrom.

Figure 2:
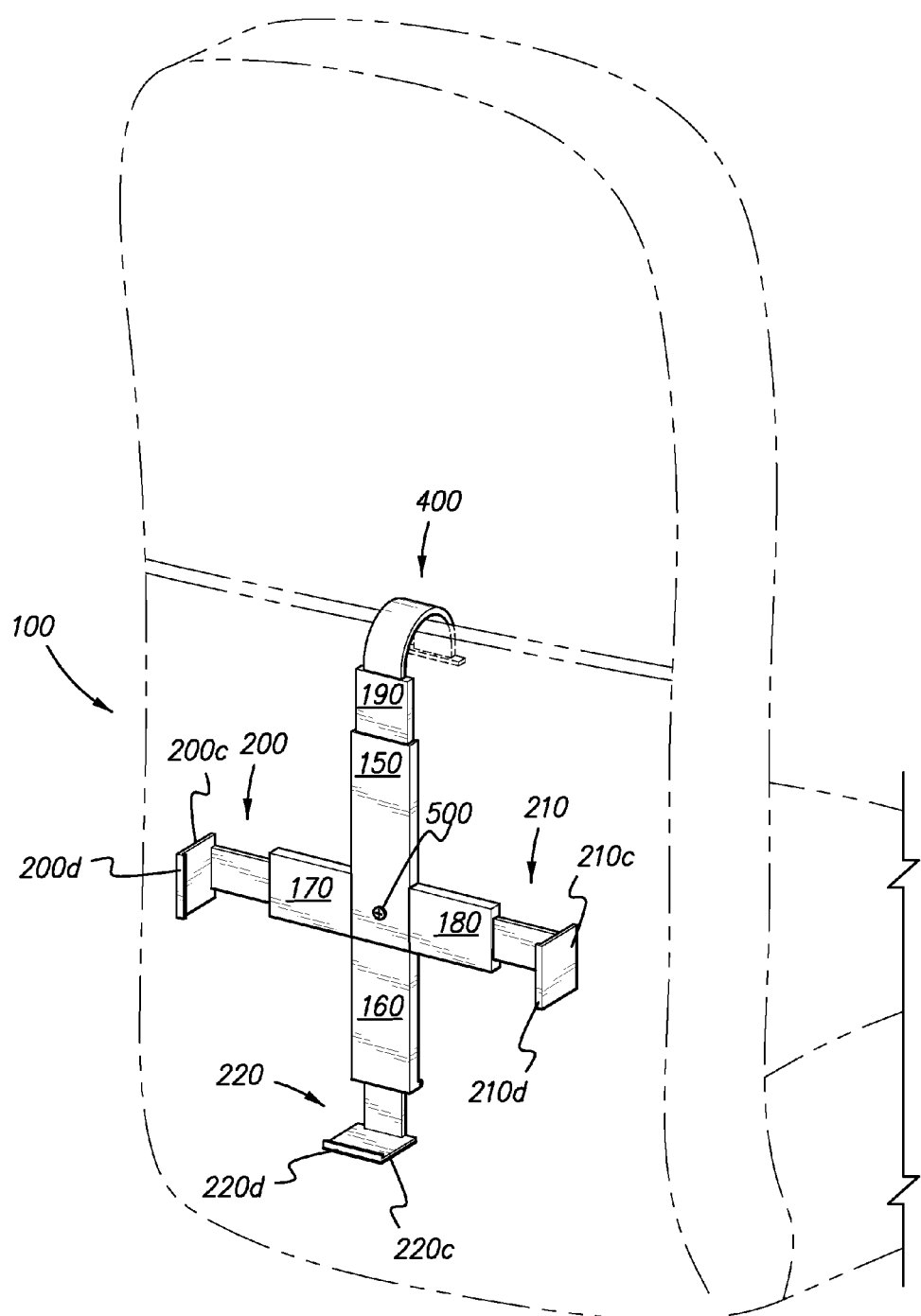
FIG. 2 is a perspective environmental view of the Adjustable Holder of FIG. 1.

More specifically, as shown in FIGS. 2 and 4, the top telescopic arm 110 includes a top elongated sleeve 150, a secondary extendable sleeve 190 and an extendable hook arm 400; the bottom telescopic arm 120 includes a bottom elongated sleeve 160 and a bottom extendable arm 220; the left telescopic arm 130 includes a left elongated sleeve 170 and a left extendable arm 200; and the right telescopic arm 140 includes a right elongated sleeve 180 and a right extendable arm 210.

Each elongated sleeve, 150, 160, 170 and 180, has a flat, rectangular flange extending from one end. However, it should be appreciated that the flange may assume any other suitable shape. The elongated sleeves are identical in structure so, in the interest of clarity, only the left elongated sleeve will be discussed. The left elongated sleeve 170 defines a sleeve channel 172. The sleeve channel 172 in turn defines a sleeve channel opening 174. In a preferred embodiment the sleeve channel opening 174 is at the end opposite the flange 176. However, either or both sides of the elongated sleeve 170 may include a channel opening. The flange 176 includes a through-hole 178 corresponding to through-holes 158, 168 and 188 for connecting the four elongated sleeves together by central securing member 500.

In a preferred embodiment the extendable arms 200, 210 and 220 are generally L-shaped and are identical in structure. Consequently, in the interest of clarity, only the left extendable arm will be discussed, but the discussion applies equally to all three (i.e. left, right and bottom) extendable arms. The left extendable arm 200 has a generally rectangular slideable arm segment with a T-shaped end 200a at one end and an opposite side, forward projecting, fin 200c at the other end. The fin 200c is perpendicular to the rest of the extendable arm 200 and has a generally planar surface with a raised edge 200d.

The fin 200c of the left extendable arm 200 is outside the left elongated sleeve 170, while the rest of the extendable arm 200 extends and retracts from its corresponding elongated sleeve 170. The T-shaped end 200a of extendable arm 200 remains inside the sleeve because the dimensions of sleeve channel 172 only allow the T-shaped end 200a to travel a certain distance before the T-shaped end 200a is obstructed by the channel walls. More specifically, the sleeve channel 172 is shaped to prevent the T-shaped end 200a from exiting the sleeve opening 174. Alternatively, the extendable arm 200 and/or sleeve channel 172 may be dimensioned to allow the extendable arm to exit the channel opening 174, so that the extendable arm 200 can be completely pulled out of its sleeve 170. Nevertheless, in a preferred embodiment the T-shaped end 200a of the left extendable arm 200 prevents the extendable arm 200 from sliding out of the sleeve opening 174 of sleeve channel 172 of sleeve 170. For example, the size or shape of the sleeve channel 172 or sleeve channel opening 174 will obstruct the T-shaped end 200a of the extendable arm from passing through the opening 174.

Each extendable arm 200, 210, 220 may be tension fitted into sleeves 170, 180 and 160 respectively. Such tension fitting provides a tight fit between the extendable arm and its corresponding sleeve. This allows for controlled adjustment of the extendable arms while maintaining a desired degree of tightness between the arm and the sleeve. In other words, the tight fit prevents each extendable arm from moving freely, or too loosely, in and out of its corresponding sleeve and enables a tight hold on the sides and bottom of a device inserted between the arms. Alternatively, a knurled wheel on a spindle inside the sleeve channel, on either side of the channel, can be used to advance the extendable arm. In this embodiment, the arm segments of each extendable arm would have complementary teeth on the side facing the knurled wheel. The knurled wheel may be sufficiently tensioned to facilitate controlled movement of the extendable arm in and out of its corresponding sleeve.

The bottom extendable arm 220 is designed to support the bottom of a device D, while the left extendable arm 200 and right extendable arm 210 are designed to firmly hold the sides of the device. More specifically, the left and right opposite side fins, 200c and 210c respectively, hold the sides of a device and prevent lateral movement of the device, while the bottom fin 220c supports the bottom of a device. A device can thus be firmly cradled between the left and right opposite side arms/fins and the bottom arm/fin.

In one embodiment, the fin surfaces that come into contact with the sides and bottom of a device D (i.e. the contact surfaces) have ridges for gripping the device. The contact surfaces of one or more fins may also have gripping pads affixed thereto made of rubber, plastic, foam, or fabric. Moreover, the pads may be bristled, contoured or smooth. In another non-limiting embodiment, the extendable arms 200, 210 and 220 may be equipped with adjustable spring clips, such as those shown in U.S. Pat. No. 2,208,860 which is incorporated herein by reference in its entirety. A spring clip may be attached to one or more fins by any appropriate means, such as gluing, welding or fastening.

Figure 13:
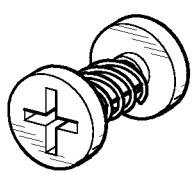
FIG. 13 is a perspective view of the central securing member.

The telescopic arms 110, 120, 130 and 140 are pivotally connected to each other and are independently rotatable about an axis of rotation. More specifically, the top elongated sleeve, left elongated sleeve, right elongated sleeve and bottom elongated sleeve are pivotally connected at their respective flanged ends with central securing member 500. Central securing member 500 is preferably a type of spring screw, as shown in FIG. 13. However, other fasteners may be used, such as a screw, bolt, or rivet and complementary nut, anchor or receiver. The terms "central securing member" and "spring screw" shall be regarded as equivalent terms in this specification. The pivotally connected sleeves are able to rotate in parallel planes about the central axis α of the central securing member 500, the planes being generally perpendicular to the central axis α.

Figure 7:
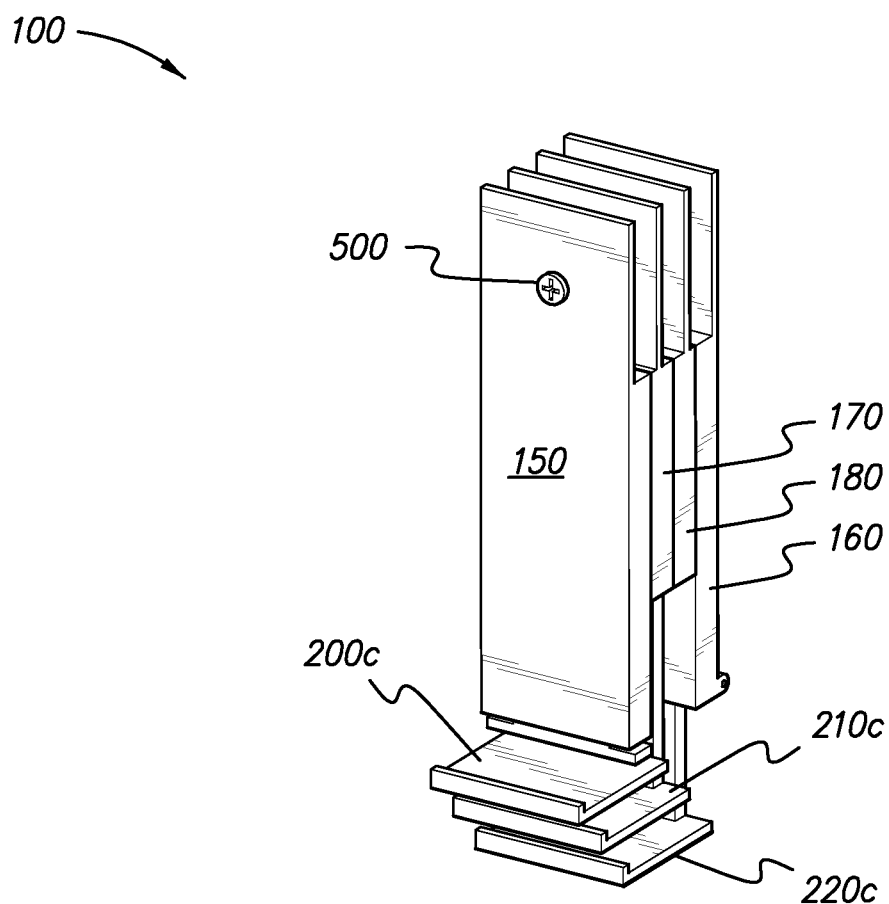
FIG. 7 is a perspective view of the Adjustable Holder in a stowed position.

In a preferred embodiment, the top, bottom, left and right elongated sleeves are connected together in a tight tension fit, so that the arms do not rotate freely, but rather must be physically rotated into a desired position using a predetermined requisite amount of force. More specifically, when the adjustable holder 100 is in a stowed position, as shown in FIG. 7, the flanged ends of the sleeves are stretched apart by the thickness of each adjacent sleeve, due to the resilient nature of spring screw 500. However, when the elongated sleeves and associated extendable arms are rotated out of the stowed position (i.e. rotated about the central axis α of the spring screw), the gaps disappear and the spring screw 500 compresses the flanged sleeve ends together (See FIG. 4). Hence, the spring screw 500 enables the elongated sleeves to be rotated and/or slightly pulled apart.

In another embodiment, each elongated sleeve may lock into position once it reaches a desired angle of rotation, preferably perpendicular to at least two other elongated sleeves. A spring loaded locking pin on the rear side of each top, left and right elongated sleeve flange extends into a corresponding slot in the flange directly behind it once the desired angle is reached. A button on the adjustable holder operatively connected to the spring loaded locking pin may be used to compress and retract it back out of its corresponding slot so as to release the elongated sleeves from their locked position.

As shown in FIG. 4, the secondary stage extendable sleeve 190 extends into and out of the larger elongated sleeve 150. The secondary sleeve 190 has a generally rectangular cross section with at least one opening and is dimensioned to fit inside elongated sleeve 150. The secondary stage sleeve is similarly tension fit into elongated sleeve 150, thereby necessitating the use of some predetermined amount of force to pull it out of elongated sleeve 150. Additionally, the secondary sleeve 190 has a T-shaped proximal end 190a that prevents it from sliding out of top sleeve 150, similar in function to T-shaped ends 200a, 210a and 220a.

The top extendable hook arm 400 extends in and out of secondary extendable sleeve 190. The hook arm 400 has a generally rectangular cross section with a T-shaped end 400a at and a tab 400b at the opposite end. The hook arm is dimensioned to fit inside secondary sleeve 190 and the T-shaped end 400a serves the same purpose as T-shaped ends 200a, 210a and 220a. That is, the T-shaped ends keep the hook arm from being pulled all the way out of secondary sleeve 190.

The hook arm 400 has a deformable shape that can curve or bend when extended out of its sleeve and straighten when inserted back into its sleeve. The hook arm can be made of a deformable material such as a bendable metal, or may have a bendable metal or bendable wire(s) embedded therein. In other words, the flexible arm can be made of any flexible material that allows the arm to bend or curve and retain its shape. The hook arm is designed to suspend the holder, with a device firmly cradled between its arms, from any suitable fixture C.

An adjustable tilt arm 600 is hingedly connected about hinge 620 to the rear of the distal end of the bottom elongated sleeve 160. In its stowed position, the tilt arm 600 is flush against the rear of the bottom elongated sleeve 160. In one embodiment, the hinge 620 has a sufficient degree of tension to prevent the arm 600 from flapping about freely. In other words, a certain amount of force is required to swivel the tilt arm 600 out from its stowed position. The hinge 620 may also have a limited degree of rotation, so that the tilt arm 600 cannot rotate beyond a predetermined angle. In use, the tilt arm 600 can alter the viewing angle of a cradled device D by pushing the cradled device away from a surface. In an alternate embodiment, a pawl and ratchet mechanism which releasably locks the tilt arm 600 into different angled positions may be used to adjust the angle of the tilt arm 600.

FIG. 7 shows the adjustable holder in its stowed position. When the holder is stowed, the extendable arms 200, 210, 220 are retracted into their corresponding sleeves 170, 180, and 160 respectively. Similarly, the hook arm 400 is retracted into secondary sleeve 190 and secondary sleeve 190 is retracted into top elongated sleeve 150. The elongated sleeves are aligned so that the sleeves are in parallel planes and are adjacent to each other. The sleeve flanges are similarly aligned in parallel planes, with a gap between each flange. The fins of the extendable arms are aligned in parallel planes, but the planes are perpendicular to the planes of the sleeves. The adjustable holder can be converted from a deployed position, as shown in FIG. 4, to a stowed position by pushing all extendable arms, including the extendable hook arm, back into their corresponding elongated sleeves. The secondary sleeve 190 is similarly pushed back into the top elongated sleeve 150. The four elongated sleeves, 150, 160, 170, and 180, are then swiveled or rotated axially about the central axis of the spring screw 500 until the sleeves and fins are in parallel alignment. In its stowed position, the adjustable holder is easy to transport or store away. For example, the stowed adjustable holder is small enough to carry in one's pant pocket or in a hand bag.

The adjustable holder may be made out of any suitable material including metal, plastic, foam, wood, or a combination of these materials.

Figure 1:
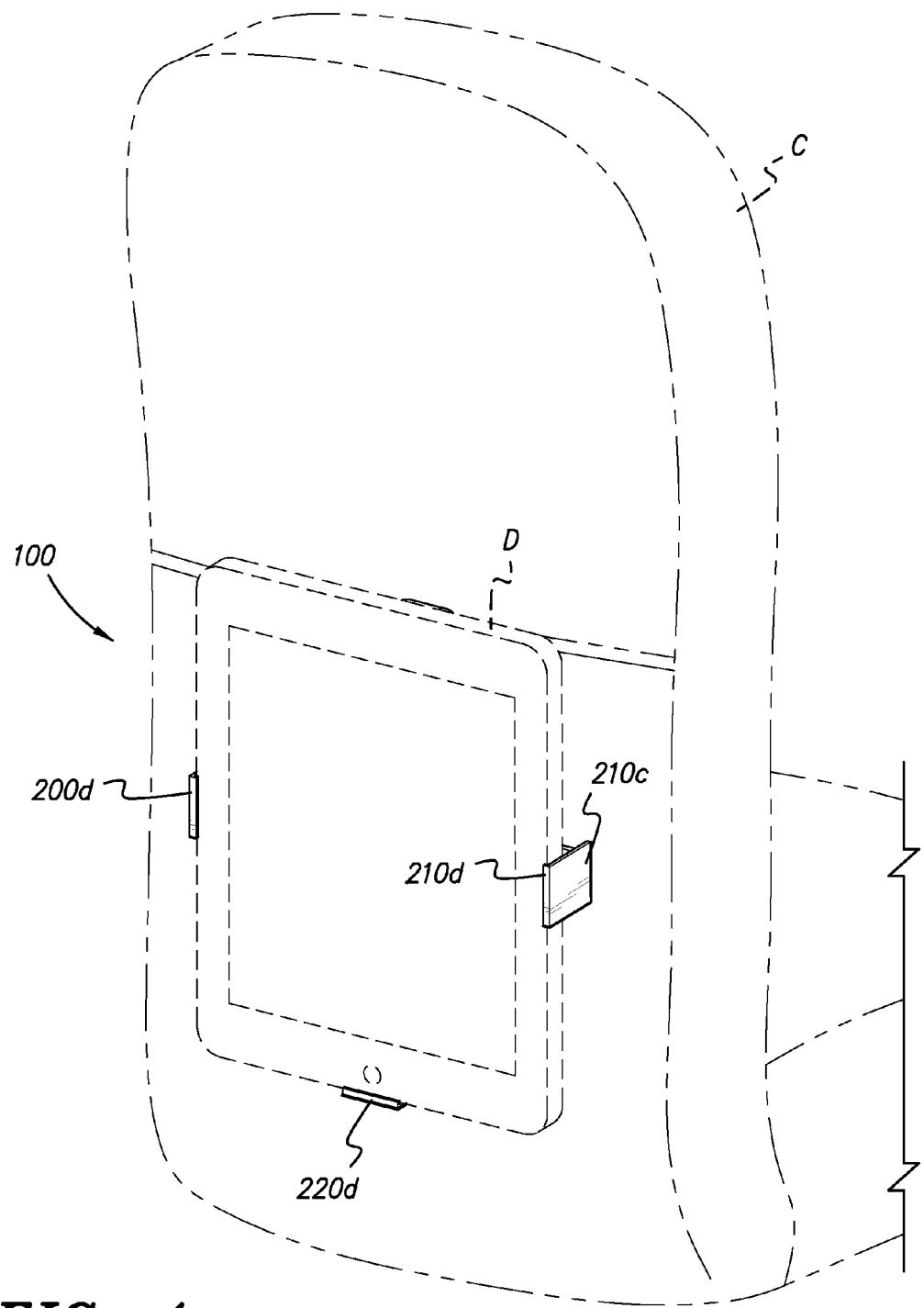
FIG. 1 is a perspective environmental view of an Adjustable Holder for Electronic Devices according to the present invention.

Referring again to the figures, FIG. 1 shows the adjustable holder suspended from the back of a seat pocket and cradling an electronic device D, such as tablet computer. It should be appreciated that neither the seat C nor the electronic device D form any part of the invention. The left and right opposite side fins, 200c and 210c respectively, firmly hold the sides of the electronic device, while the bottom fin 220d supports the bottom of the device.

FIG. 2 shows the adjustable holder 100 suspended from a seat pocket without an electronic device being held. In this figure, elongated sleeves 150, 160, 170 and 180 are roughly perpendicular to each other and the extendable arms 200, 210 and 220 are fully extended. Similarly, secondary sleeve 190 and hook arm 400 are fully extended. Hook arm 400 is hooked around the edge of a seat pocket and is supporting the adjustable holder.

Figure 3:
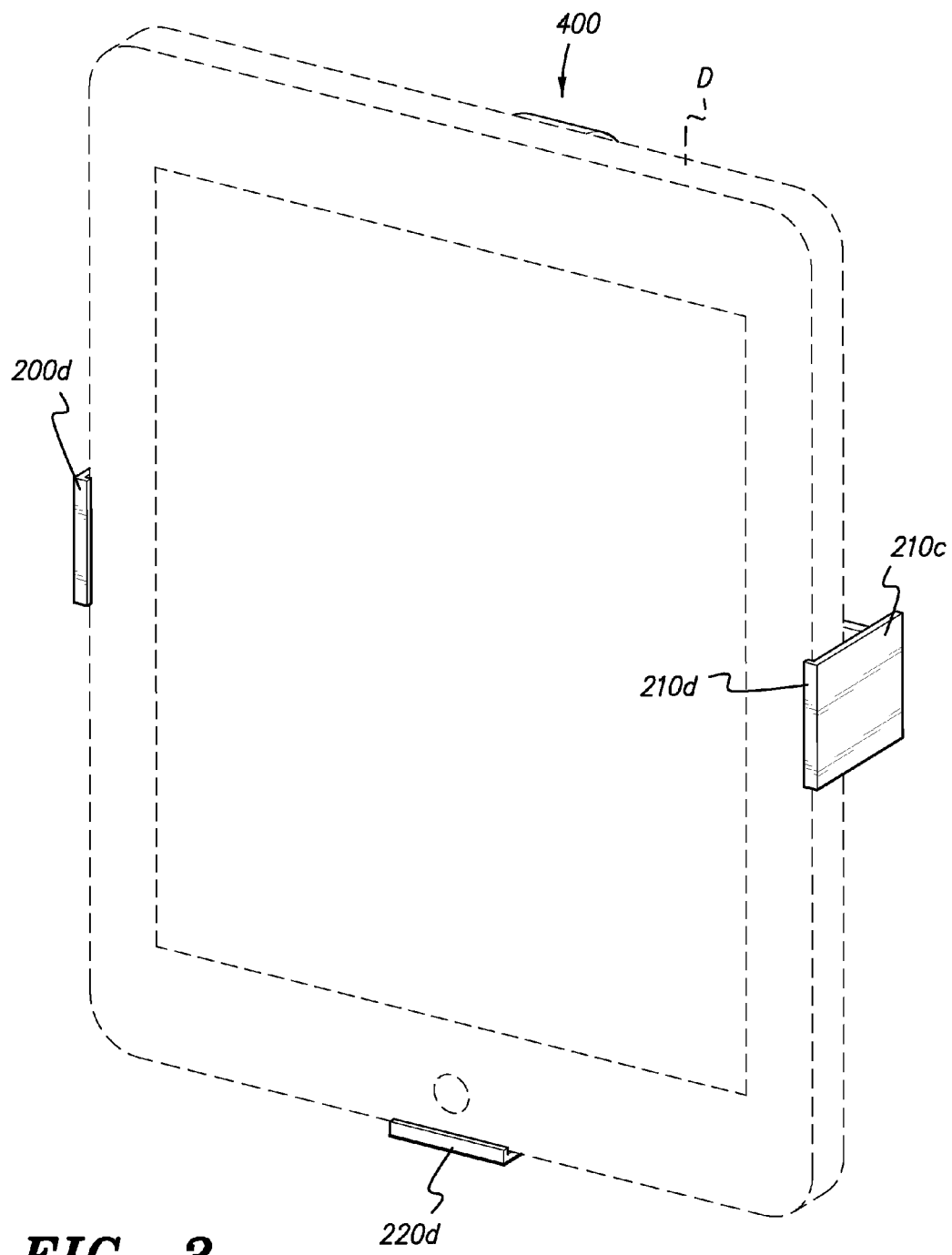
FIG. 3 is a perspective view showing an iPad device cradled in the Adjustable Holder.

FIG. 3 shows the left, right and bottom fins 200c, 210c and 220c respectively, framing the sides and bottom of an electronic device, such as a tablet computer or electronic book reading device. Each fin has a raised edge 200d, 210d, and 220d that extends out in front of the electronic device to keep it from falling forward. The curved hook arm 400 is visible behind the electronic device.

FIG. 4 is a close-up view of the adjustable holder in a deployed position. The top 110, bottom 120, left 130, and right 140 telescopic arms are roughly perpendicular to each other forming a cross-like shape. To arrive at this deployed position from a stowed position, the sleeves 160, 170, 180, and 190 are rotated axially in parallel vertical planes about a central axis α through the central securing member 500, until the sleeves are roughly perpendicular to each other. The sleeves and associated arms stay in the deployed position without any external support by virtue of the tight pivotal connection between the sleeve flanges. The extendable arms 200, 210 and 220 move in and out of their corresponding elongated sleeves in a controlled manner due to the tight tension fit between the extendable arms and their corresponding sleeves. The secondary sleeve 190 is also in tight fit relation to the elongated top sleeve 150, so that it can be extended in a controlled manner.

The opposite side extendable arms 200 and 210 can be adjustably extended widthwise to fit the width of an electronic device, such as a tablet computer or electronic reading device. Similarly, the bottom extendable arm can be adjustably extended lengthwise to fit the length of the electronic device. The top elongated sleeve 150 and secondary sleeve 190 can adjustably provide lengthwise back support to an electronic device. The bendable hook arm 400 can move in and out of secondary sleeve 190 by pulling or pushing tab 400b.

Figure 5:
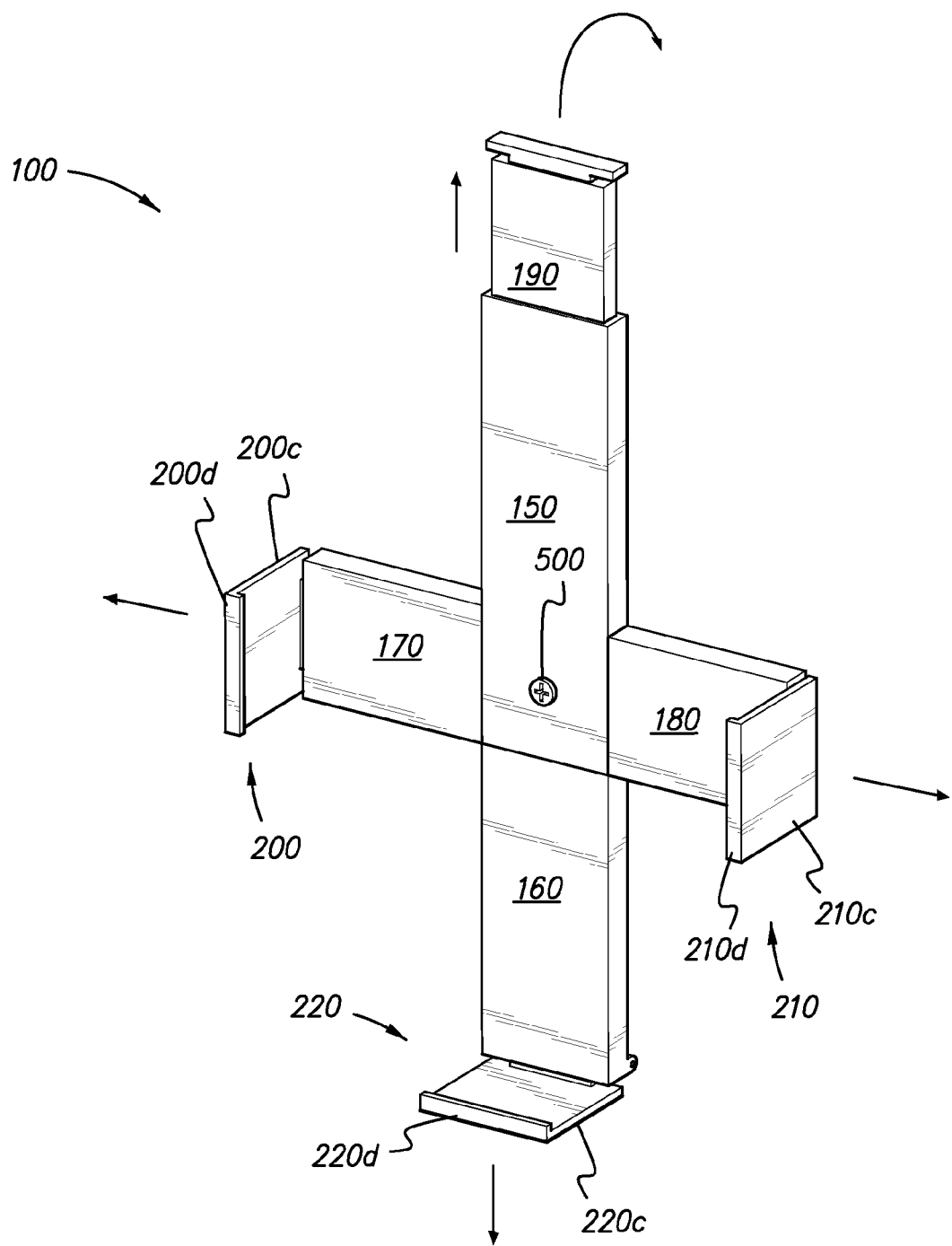
FIG. 5 is a perspective view of the Adjustable Holder with arms retracted.

FIG. 5 shows a partially deployed adjustable holder with sleeves rotated into a deployed position, roughly perpendicular to each other. The extendable arms however are fully retracted into their corresponding sleeves. The fins 200c, 210c, and 220c are visible outside the sleeves, as they remain outside the sleeves when the extendable arms are retracted. The left, right and bottom fins each have a raised edge 200d, 210d and 220d respectively. The secondary sleeve 190 is partially extended out of elongated sleeve 150, while the hook arm 400 is fully retracted inside of secondary sleeve 190. Tab 400b, however, remains outside of secondary sleeve 190, as it cannot pass through the opening of the secondary sleeve.

Figure 6:
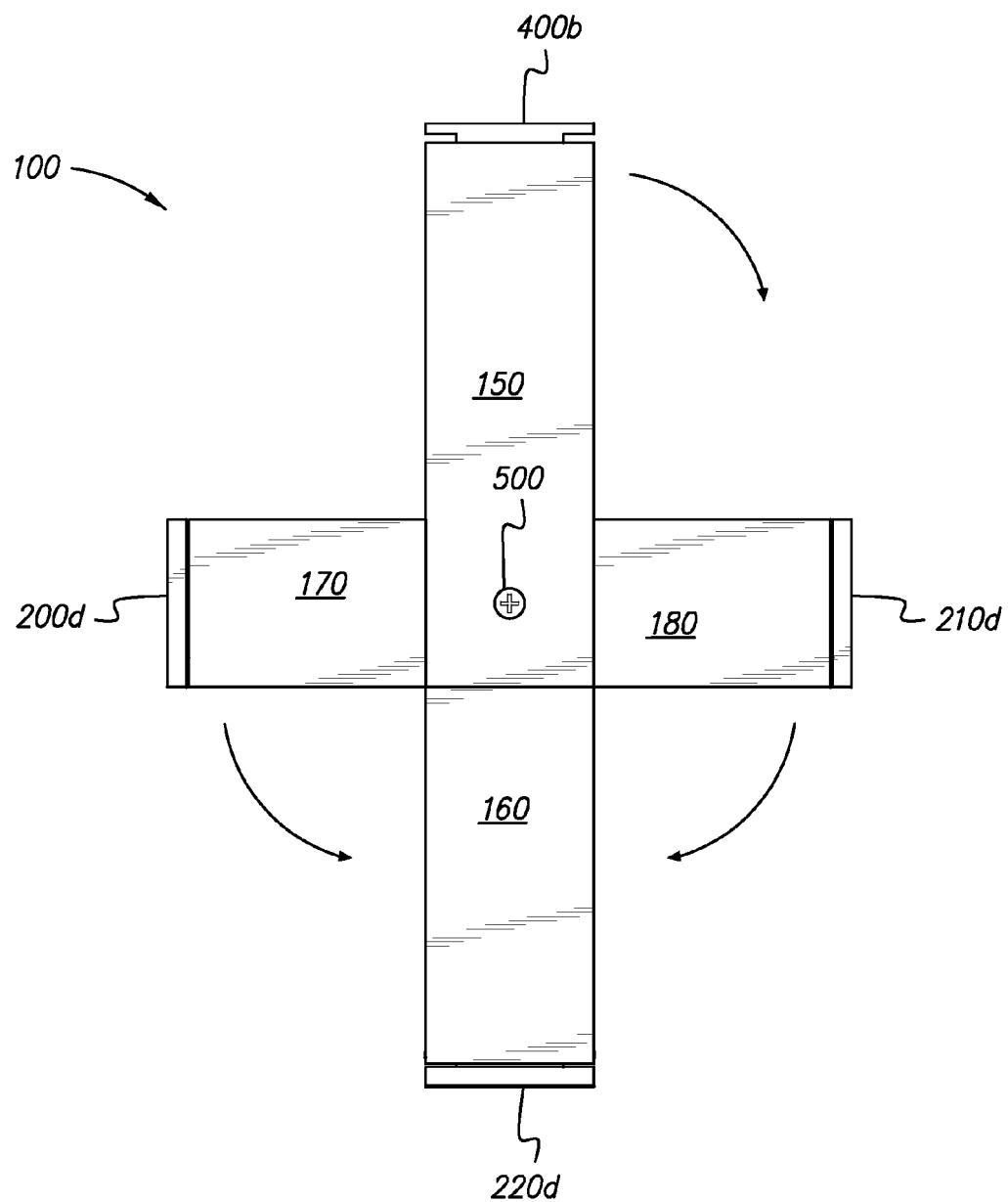
FIG. 6 is a front elevation view of the Adjustable Holder with arms retracted.

FIG. 6 is a front view of the adjustable holder showing how the elongated sleeves 150, 160, 170, 180 rotate axially in parallel planes about a central axis through central securing member 500.

FIG. 7 shows the adjustable holder in a stowed position. The telescopic arms are fully retracted. More specifically, the extendable arms, secondary sleeve and hook arm are all housed in their corresponding sleeves. The elongated sleeves 150, 160, 170, and 180 have been rotated such that they are in parallel alignment, adjacent to each other. Similarly, sleeve flanges 156, 166, 176 and 186 and fins 200c, 210c and 220c are in parallel alignment, but are not adjacent to each other (i.e. there are gaps between each fin and gaps between each flange). The elongated sleeves can remain in the stowed position until ample rotational force is applied to each sleeve to rotate it out of the stowed position. Rotational force is required because the sleeves are tightly connected to one another through their respective flanges via central securing member 500.

Figure 8:
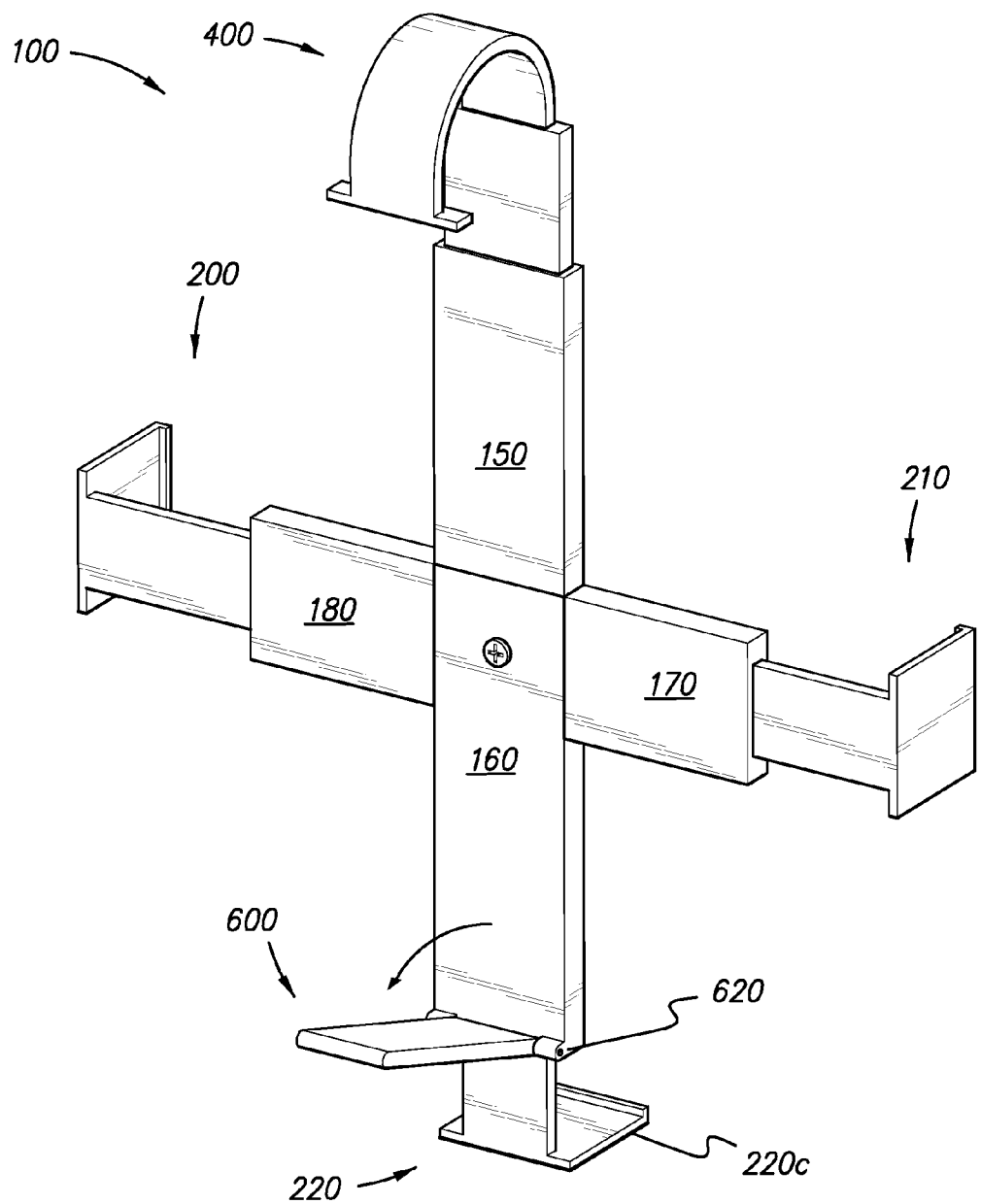
FIG. 8 is a rear perspective view of the Adjustable Holder.

FIG. 8 shows the rear of the adjustable holder. The hinged tilt arm 600 is shown rotated to a desired angle. The degree of tension in the hinge 620 is such that an ample amount of force must be employed to rotate the tilt arm. In its stowed position, the tilt arm is adjacent to the bottom rear elongated sleeve 160.

Figure 9:
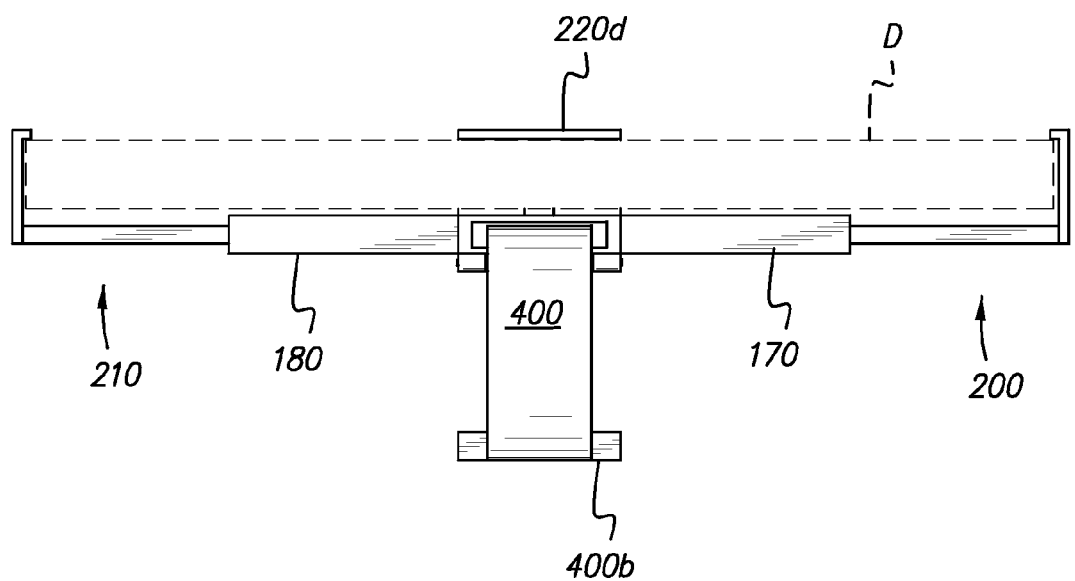
FIG. 9 is a top plan view of the Adjustable Holder cradling a device.

FIG. 9 is a top plan view of the adjustable holder with an electronic device firmly cradled between the telescopic arms. More specifically, the opposite side fins 200c and 210c of the extendable arms 200 and 210 respectively, hold the sides of device D, while the bottom fin 220c supports the bottom of device D. The raised edges 200d, 210d and 220d of the side and bottom fins extend in front of device D to prevent it from falling forward.

Figure 10:
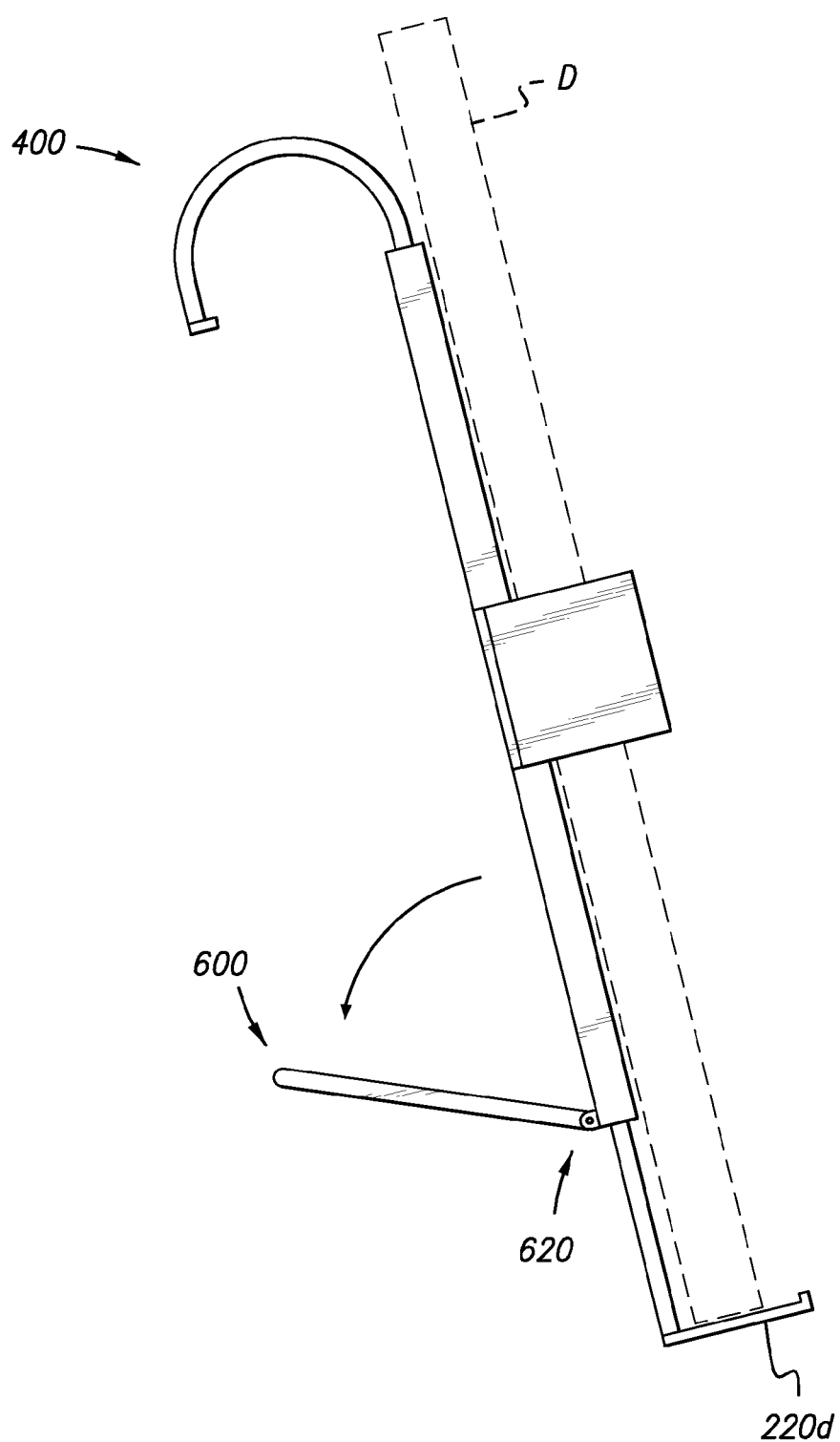
FIG. 10 is a side elevation view of the Adjustable Holder cradling a device.

FIG. 10 shows the left side of the adjustable holder with the tilt arm 600 rotated to a desired angle. The bottom fin 220c of extendable arm 220 is shown supporting the bottom of an electronic device while the opposite side fins 200c and 210c firmly hold the sides of the electronic device. Hook arm 400 is shown partially extended from secondary sleeve 190.

Figure 11:
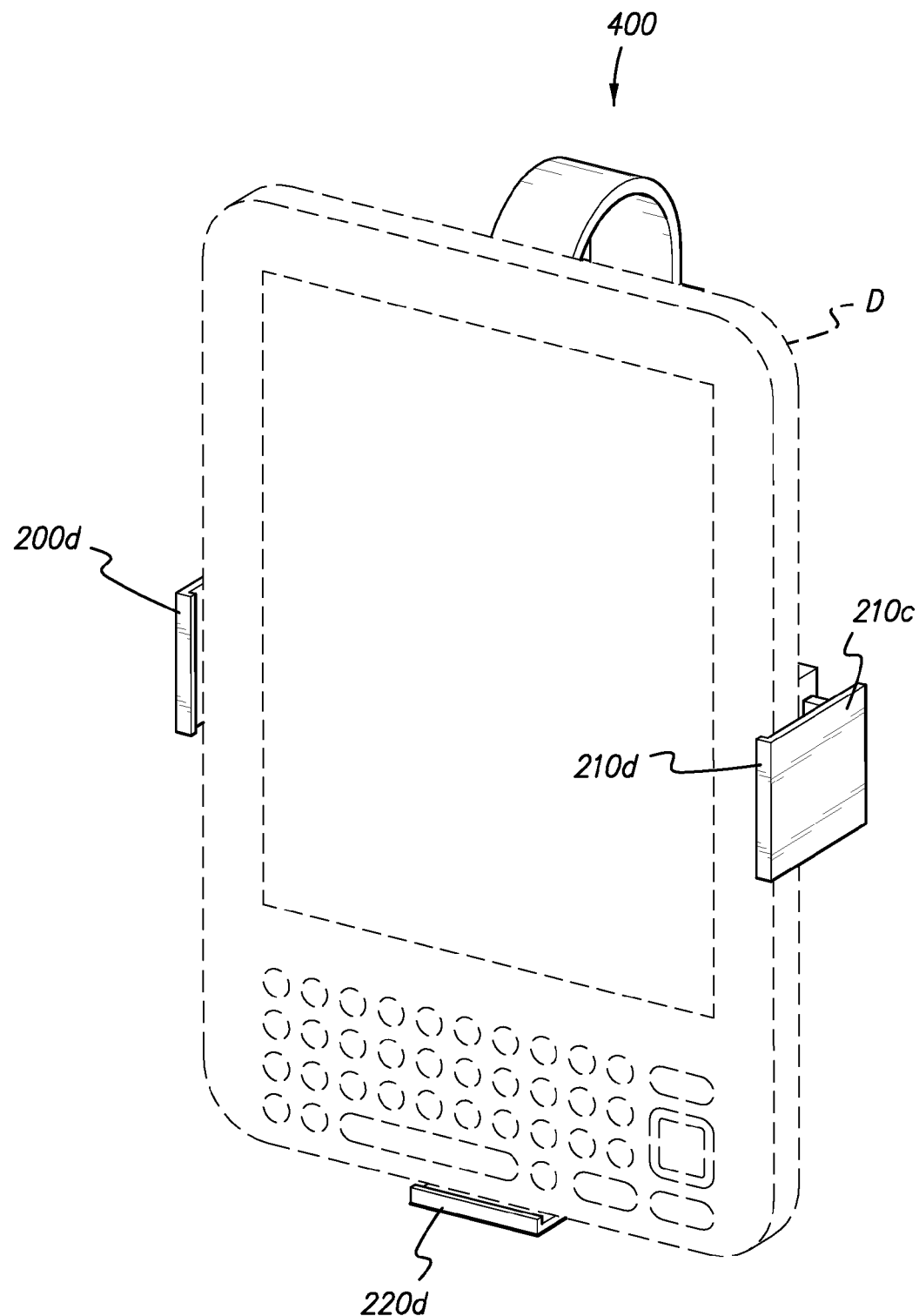
FIG. 11 is a perspective view of the Adjustable Holder cradling a Kindle device.
Figure 12:
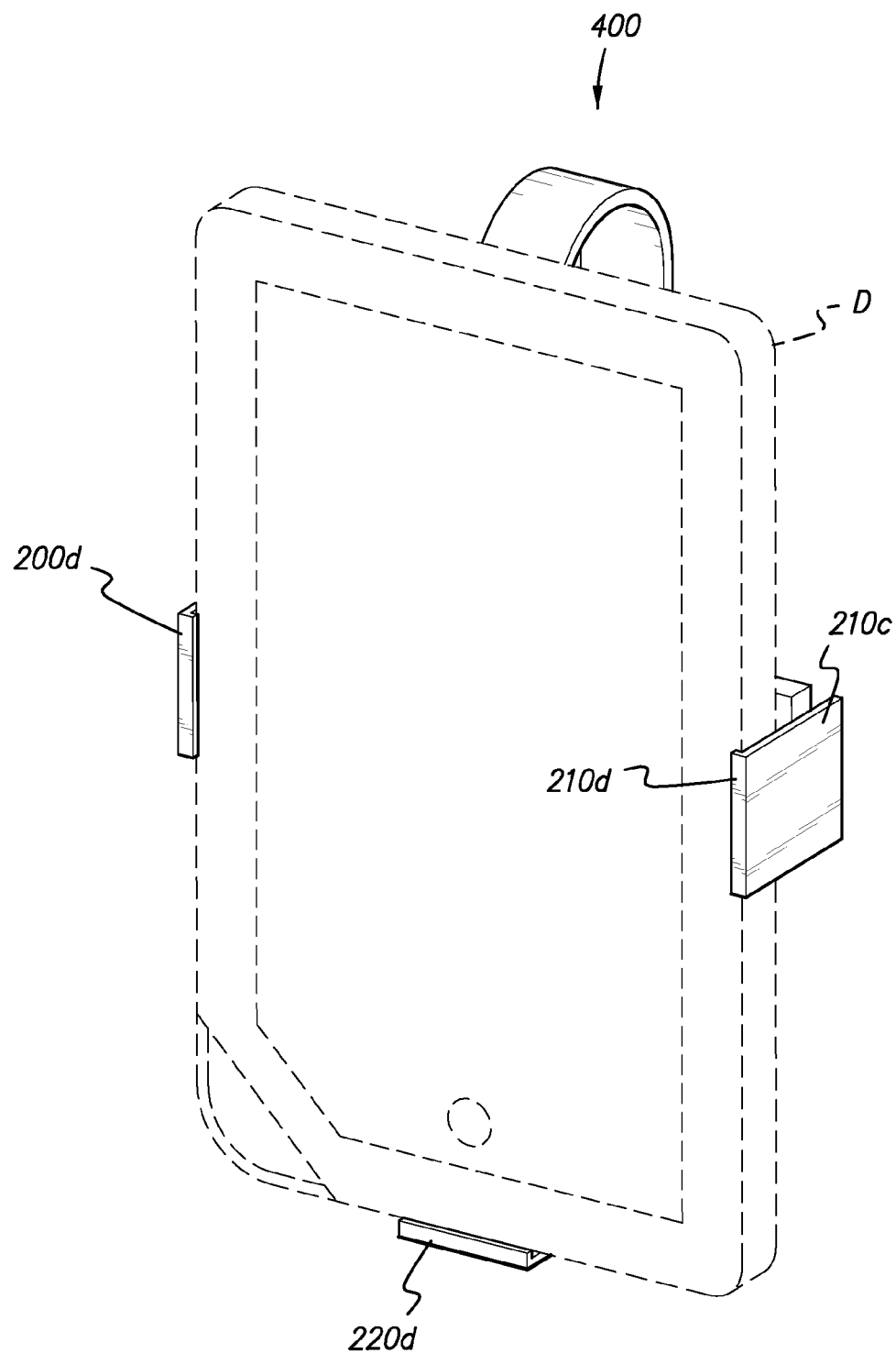
FIG. 12 is a perspective view of the Adjustable Holder cradling a Nook device.

FIG. 11 shows an electronic device D, such as a Kindle®, cradled between fins 200c, 210c and 220c. The hook arm 400 is visible behind the electronic device. The raised edges of the fins extend in front of the electronic device to prevent it from falling forward. Similarly FIG. 12 shows a Nook™ type device cradled between the fins.

FIG. 13 shows central securing member 500, which is preferably a spring screw. However, the central securing member 500 may be any appropriate fastener known in the art. The central securing member 500 pivotally connects the elongated sleeves together. More specifically, the spring screw fits through aligned through-holes in each of the sleeve flanges thereby connecting the sleeves together.

Figure 14:
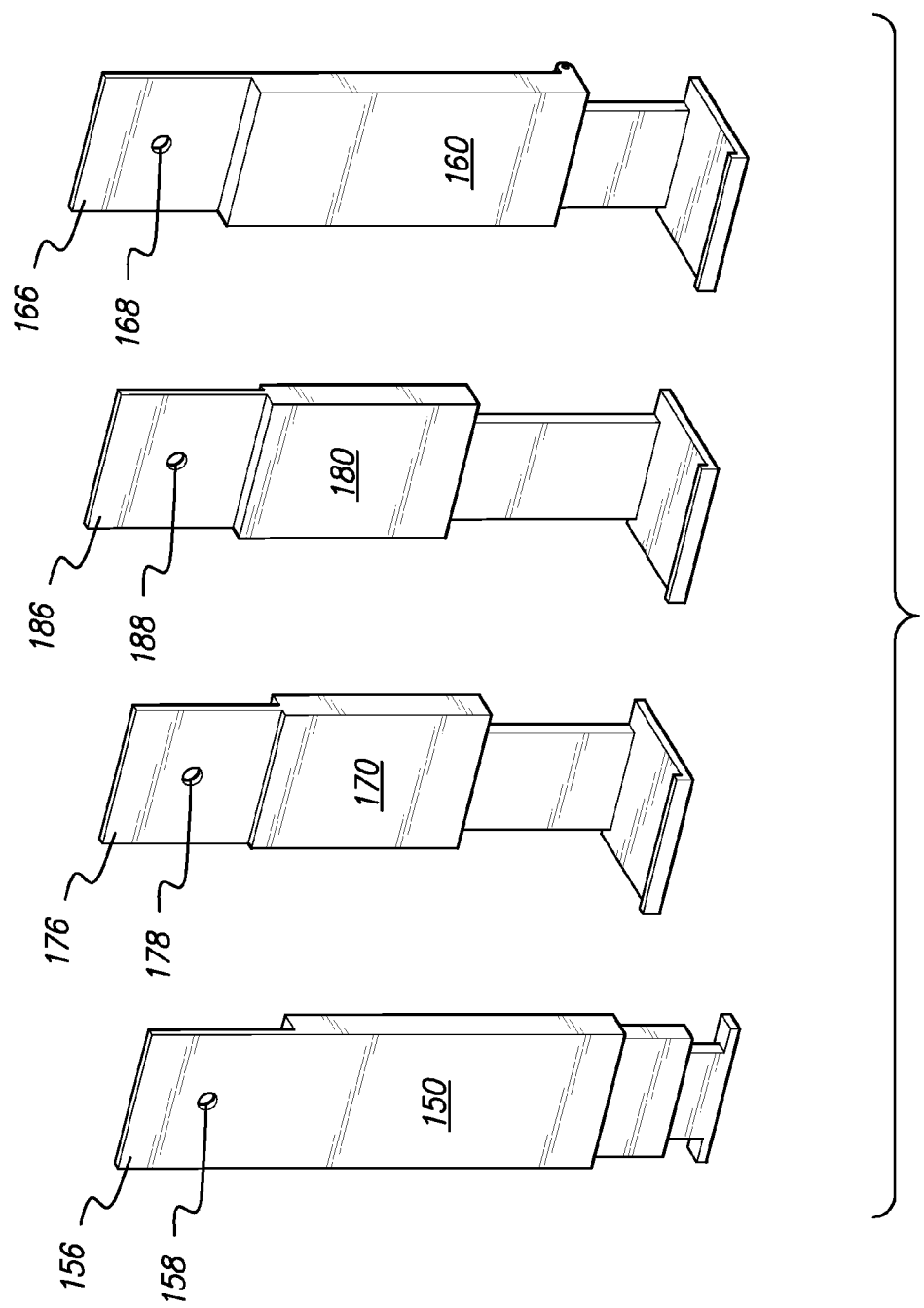
FIG. 14 is a perspective view of the elongated sleeves with flanges and associated arms.

FIG. 14 shows the four elongated sleeves 150, 160, 170 and 180 detached from each other. The flanges 156, 166, 176 and 186 of the elongated sleeves are shown with their respective through-holes 158, 168, 178 and 188. The through-holes accommodate central securing member 500, which rotatably and resiliently connects the elongated sleeves. Extendable arms 200, 210 and 220 are shown extended from their corresponding sleeves in varying degrees of extension. Secondary sleeve 190 is shown slightly extended from elongated sleeve 150, while extendable hook arm 400 is shown slightly extended from secondary sleeve 190.

FIGS. 15A-15C show a table of part numbers, their associated part names, and their respective functions.

It is to be understood that the present invention is not limited to the embodiments described above, but encompasses any and all embodiments within the scope of the following claims.

What is claimed:

1. An adjustable holder for an electronic device comprising:
   a top elongated sleeve, a bottom elongated sleeve, a left elongated sleeve, and a right elongated sleeve, wherein each of the elongated sleeves define a distal end and proximal end, wherein the proximal end defines a flange;
   a bottom extendable arm, a left extendable arm, and a right extendable arm, wherein each of the extendable arms defines a distal end and proximal end, wherein each extendable arm extends from and into a corresponding elongated sleeve such that the proximal ends of each extendable arm remain inside the corresponding sleeve, wherein the distal end of each extendable arm defines a forward extending fin with a raised edge;
   a secondary sleeve, wherein the secondary sleeve defines a distal end and proximal end, wherein the secondary sleeve extends from and into the top elongated sleeve such that the proximal end of the secondary sleeve remains inside the top elongated sleeve;

an extendable hook arm, wherein the hook arm defines a distal end and proximal end, wherein the hook arm extends from and into the secondary sleeve such that the proximal end of the hook arm remains inside the secondary sleeve, wherein the hook arm has a deformable shape that can curve or bend when extended out of its sleeve and straighten when inserted back into its sleeve;

a central securing member, wherein the central securing member defines a lengthwise central axis, wherein the top, bottom, left, and right sleeves are pivotally attached at their flanged proximal ends to the central securing member, wherein the top, bottom, left, and right sleeves are rotatable in parallel planes about the central axis of the central securing member such that the top, bottom, left, and right sleeves can be stowed in parallel alignment and adjacent to each other, wherein during normal use of the support frame the sleeves and associated arms are substantially perpendicular to the central axis; and an adjustable tilt arm hingedly connected to the back, distal end, of the bottom elongated sleeve.

2. The adjustable holder of claim 1 wherein the central securing member is a spring screw.

3. The adjustable holder of claim 1 wherein the proximal end of the left, right and bottom extendable arms is T-shaped.

4. The adjustable holder of claim 1 wherein the proximal end of the secondary sleeve is T-shaped.

5. The adjustable holder of claim 1 wherein the proximal end of the extendable hook arm is T-shaped.

6. The adjustable holder of claim 1 wherein the distal end of the extendable hook arm defines a tab.

7. The adjustable holder of claim 1 wherein each fin has a gripping pad affixed thereto.

8. The adjustable holder of claim 7 wherein the gripping pads are bristled.

9. An adjustable holder for an electronic device comprising:

a top elongated sleeve, a bottom elongated sleeve, a left elongated sleeve, and a right elongated sleeve, wherein each of the elongated sleeves define a distal end and proximal end, wherein each proximal end defines a flange;

a bottom extendable arm, a left extendable arm, and a right extendable arm, wherein each of the extendable arms define distal and proximal ends thereof, wherein each extendable arm extends from and into a corresponding elongated sleeve such that the proximal ends of each extendable arm remain inside the corresponding sleeve, wherein the distal end of each extendable arm defines a forward extending fin with a raised edge and the proximal end of each extendable arm is T-shaped;

a secondary sleeve, wherein the secondary sleeve defines a distal end and proximal end, wherein the secondary sleeve extends from and into the top elongated sleeve such that the proximal end of the secondary sleeve remains inside the top elongated sleeve, wherein the proximal end of the secondary sleeve is T-shaped;

an extendable hook arm, wherein the hook arm defines a distal end and a proximal end, wherein the hook arm extends from and into the secondary sleeve such that the proximal end of the hook arm remains inside the secondary sleeve, wherein the proximal end of the hook arm is T-shaped and the distal end of the hook arm defines a tab, wherein the hook arm has a deformable shape that can curve or bend when extended out of its sleeve and straightens when inserted back into its sleeve;

a central securing member, wherein the central securing member defines a lengthwise central axis, wherein the top, bottom, left, and right sleeves are pivotally attached at their flanged proximal ends to the central securing member, wherein the top, bottom, left, and right sleeves are rotatable in parallel planes about the central axis of the central securing member such that the top, bottom, left, and right sleeves can be stowed in parallel alignment and adjacent to each other, wherein during normal use of the adjustable holder the sleeves and associated arms are substantially perpendicular to the central axis; and an adjustable tilt arm hingedly connected to the rear, distal end, of the bottom elongated sleeve.

10. The adjustable holder of claim 9, wherein the central securing member is a spring screw.

11. The adjustable holder of claim 9, wherein each fin has a gripping pad affixed thereto.

12. The adjustable holder of claim 11, wherein the gripping pads are bristled.

* * * * *